(12) United States Patent
Sanchez et al.

(10) Patent No.: US 9,023,194 B2
(45) Date of Patent: May 5, 2015

(54) PROCESS FOR REFORMING HYDROCARBON CUTS

(75) Inventors: Eric Sanchez, Saint Genis Laval (FR); Jacques Rault, Paris (FR); Pierre Yves Le Goff, Paris (FR); Christophe Pierre, Carrieres sur Seine (FR); Joana Fernandes, Santo Antonio Dos Cavaleir (PT)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 233 days.

(21) Appl. No.: 13/281,582

(22) Filed: Oct. 26, 2011

(65) Prior Publication Data

US 2012/0125814 A1 May 24, 2012

(30) Foreign Application Priority Data

Oct. 28, 2010 (FR) .................................. 10 04245

(51) Int. Cl.
| | | |
|---|---|---|
| C10G 45/68 | (2006.01) | |
| C10G 45/58 | (2006.01) | |
| C10G 53/16 | (2006.01) | |
| C10G 59/00 | (2006.01) | |
| C10G 31/06 | (2006.01) | |
| C10G 35/04 | (2006.01) | |
| C10G 47/00 | (2006.01) | |

(52) U.S. Cl.
CPC ............... C10G 59/00 (2013.01); C10G 31/06 (2013.01); C10G 35/04 (2013.01); C10G 47/00 (2013.01); C10G 2300/1014 (2013.01); C10G 2300/1018 (2013.01); C10G 2300/4081 (2013.01)

(58) Field of Classification Search
USPC ........................ 208/78, 79, 80, 133, 134, 141
See application file for complete search history.

(56) References Cited

U.S. PATENT DOCUMENTS

| | | | |
|---|---|---|---|
| 4,409,092 A | 10/1983 | Johnson et al. | |
| 4,594,144 A | 6/1986 | James, Jr. et al. | |
| 6,342,152 B1 | 1/2002 | Yoshita | |

FOREIGN PATENT DOCUMENTS

| | | |
|---|---|---|
| FR | 2 223 447 A1 | 10/1974 |
| GB | 1 166 756 A | 10/1969 |

(Continued)

OTHER PUBLICATIONS

Parkash, S, Refining Processes Handbook, 2003, Gulf Publishing, p. 109-152.*

(Continued)

Primary Examiner — Walter D Griffin
Assistant Examiner — Derek Mueller
(74) Attorney, Agent, or Firm — Millen, White, Zelano & Branigan, P.C.

(57) ABSTRACT

A process for reforming a feed composed of one or more hydrocarbon cuts containing 9 to 22 carbon atoms which includes, at least one first step for reforming the feed in at least one reforming unit, during which a stream of hydrogen is produced and at least one first step for distillation of the effluent from the reforming unit in the presence of a reforming catalyst in order to obtain 4 cuts. The 4 cuts are, a liquefied petroleum gas cut (LPG) (A), a $C_5$-$C_8$ cut: naphtha (B), a $C_9$-$C_{15}$ cut: densified kerosene (C), and a $C_{16}$-$C_{22}$ cut: densified gas oil cut (D). The invention also concerns the device for carrying out this process.

11 Claims, 2 Drawing Sheets

(56) References Cited

FOREIGN PATENT DOCUMENTS

WO WO 2006/088314 A1 8/2006
WO WO 2008/144782 A2 11/2008

OTHER PUBLICATIONS

Dry, M, The Fischer-Tropsch process: 1950-2000, 2002, Catalysis Today, vol. 71, p. 227-241.*
Search Report of FR 1004245 (Jun. 6, 2011).

* cited by examiner

PROCESS FOR REFORMING HYDROCARBON CUTS

The invention relates to the field of processes for the catalytic reforming of hydrocarbon cuts, and more particularly a process for the moving bed catalytic reforming of hydrocarbon cuts containing 9 to 22 carbon atoms derived from XTL techniques (X compounds to liquid) consisting of transforming gas, biomass and/or coal to fuel or derived from the hydrotreatment of vegetable or animal oils.

The increasing use of alternative and/or renewable sources such as biomass, gas and/or coal by XTL techniques (including BTL, biomass to liquid, CTL, coal to liquid, and GTL, gas to liquid), and of products derived from the hydrotreatment of vegetable or animal oils in order to produce fuel bases for conventional refining, the use of heavier and heavier crude oil and the drive to upgrade the 350° C. or 550° C. fraction as far as possible using the deasphalting process, as well as changes in bunker fuel specifications, means that it is important to maximize the production of middle distillates with a low sulphur content and an improved fluxing power (by an aromatics effect). In addition, the hydrogen balance of the refinery is also improved, meaning that substantial savings can be made in terms of operational expenses and capital expenses (OPEX and CAPEX). The middle distillate is defined as a hydrocarbon cut principally composed of long paraffins and iso-paraffins containing 9 to 22 carbon atoms.

Middle distillates derived from XTL processes or from the hydrotreatment of vegetable or animal oils all have low density, regardless of the origin of the feed (biomass, gas, coal, managed waste, etc). The need to satisfy the final specifications of commercial products, principally the density, has thus led to such middle distillates currently being used as a blend with a heavier distillate derived from crude oil in a quantity of 50/50, for example with alkylbenzene type compounds, in order to increase the density of the products.

Thus, the present invention concerns a novel process which can be used to overcome the problems of blending and/or supplementing with one or more products derived from fossil resources in order to be able to satisfy commercial market specifications for cuts derived from XTL techniques or derived from the hydrotreatment of vegetable or animal oils and to allow maximizing of the production of middle distillate with a low sulphur content and an improved fluxing power for conventional refinery cuts (from fossil energy).

The novel process of the present invention is a process for the catalytic reforming of middle distillate, i.e. composed of hydrocarbon cuts containing 9 to 22 carbon atoms, allowing densification of the middle distillate by converting all or a portion of it into aromatics and poly-aromatics.

The continuous process for catalytic reforming of hydrocarbons is a process which is known to the skilled person, employing a reaction zone comprising a series of 3 or 4 reactors in series, operating in moving bed mode, and having a catalyst regeneration zone which itself includes a certain number of steps, including a step for combustion of coke deposited on the catalyst in the reaction zone, an oxychlorination step, and a final step for reduction of the catalyst in hydrogen. After the regeneration zone, the catalyst is re-introduced to the head of the first reactor of the reaction zone.

It is known that short paraffins can be transformed into aromatics (less than 10-12 carbon atoms) by means of the reforming process via cyclization and dehydrogenation reactions, this reaction scheme being known as dehydrocyclization.

Dehydrocyclization of long paraffins (more than 12 carbon atoms), on the other hand, is not carried out for various reasons, primarily:

in long paraffins, the only existing industrial processes consist of dehydrogenation to obtain olefins and in particular is not aimed at cyclization to produce aromatics in order to satisfy the commercial specifications of the final product (LAB, linear alkyl benzene);

dehydrocyclization of long paraffins on standard catalysts is accompanied by substantial coke production and standard regeneration processes do not allow large quantities of coke to be burned continuously while sufficiently maintaining the physico-chemical properties of the catalyst required for the dehydrocyclization reaction;

for standard catalysts, the dehydrocyclization of long paraffins is accompanied by substantial cracking. That cracking inhibits the formation of aromatics and polyaromatics, the aim of the invention, and limits the upgradeable product yields.

Thus, the aim of the present invention is to overcome one or more of the disadvantages of the prior art by providing a novel process for reforming hydrocarbon cuts containing 9 to 22 carbon atoms that on the one hand can overcome problems associated with blending and/or supplementing with one or more products from fossil resources in order to be able to satisfy commercial market specifications, and on the other hand can overcome the problems which normally arise when carrying out a reforming process on hydrocarbon cuts containing more than 12 carbon atoms.

To this end, the present invention proposes a process for reforming a feed composed of one or more hydrocarbon cuts containing 9 to 22 carbon atoms comprising:

at least one first step for reforming the feed in at least one reforming unit, during which a stream of hydrogen is produced;

at least one first step for distillation of the effluent from the reforming unit in the presence of a reforming catalyst in order to obtain 4 cuts:

a liquefied petroleum gas cut (LPG) (A);
a $C_5$-$C_8$ cut: naphtha (B);
a $C_9$-$C_{15}$ cut: densified kerosene (C);
a $C_{16}$-$C_{22}$ cut: densified gas oil cut (D).

In one implementation of the invention, the reforming step is carried out at a temperature in the range 350° C. to 540° C., and a pressure in the range 0.2 to 2 MPa.

In one implementation of the invention, the reforming step is carried out with a recycle ratio in the range 1.5 to 7. The recycle ratio is the ratio of the molar flow rate of hydrogen to the molar flow rate of hydrocarbon feed.

In one implementation of the invention, the process comprises, before the reforming step, a step for fractionation of the feed into two hydrocarbon cuts, a first cut containing 9 to 15 carbon atoms and a second cut containing 16 to 22 carbon atoms.

In another implementation of the invention, the process comprises a second step for reforming which is independent of the first reforming step, the first reforming step being for the first cut and the second reforming step being for the second cut.

In one implementation of the invention, the process comprises a step for regenerating the reforming catalyst.

In one implementation of the invention, the catalyst regeneration step is common to the two steps for reforming the two cuts.

In another implementation of the invention, the process comprises two independent catalyst regeneration steps, a first catalyst regeneration step being associated with the first step for reforming the first cut and a second catalyst regeneration step being associated with the second step for reforming the second cut.

In another implementation of the invention, the process comprises a second distillation step, a first step for distillation of the first effluent from the first reforming step and a second step for distillation of the second effluent from the second reforming step.

In another implementation of the invention, said feed used in said process is derived from XTL technology or from the hydrotreatment of vegetable or animal oils.

The invention also concerns a device for the catalytic reforming of a feed composed of one or more hydrocarbon cuts containing 9 to 22 carbon atoms employing the process of the invention comprising at least one reforming unit and at least one reforming catalyst regeneration unit comprising 1 to 6 combustion beds.

In one implementation of the invention, the device comprises a second catalytic reforming unit.

In another implementation of the invention, the device comprises a second catalyst regeneration zone associated with the second catalytic reforming zone.

In one implementation of the invention, the device comprises a section for distillation of an effluent derived from at least one catalytic reforming zone.

In another implementation of the invention, the device comprises a second section for distillation of effluent derived from the second catalytic reforming zone.

BRIEF DESCRIPTION OF THE DRAWINGS

Other characteristics and advantages of the invention will be better understood and become clearer from the following description, made with reference to the accompanying drawings, given by way of example, in which.

Figure 1:
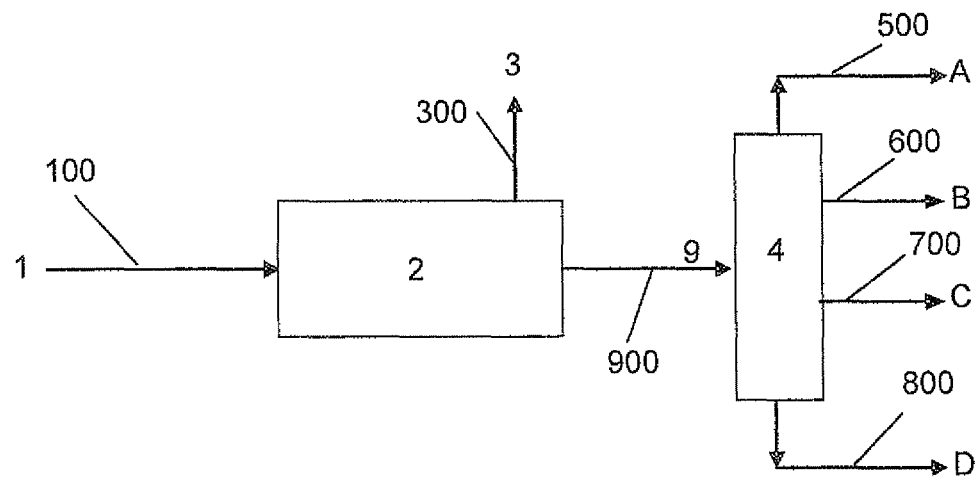
FIG. 1 is a diagrammatic representation of a first variation of the process of the invention.

The process of the invention consists of reforming a feed composed of one or more hydrocarbon cuts containing 9 to 22 carbon atoms, also known as a middle distillate. In accordance with one implementation of the invention, the feed composed of one or more hydrocarbon cuts containing 9 to 22 carbon atoms may initially be fractionated before the reforming step using a fractionator for separation into two cuts: a cut containing 9 to 15 carbon atoms (kerosene cut) and a cut containing 16 to 22 carbon atoms (gas oil cut). This fractionation is intended to simplify the subsequent operations, especially the reforming step.

The process may also be carried out by adding a feed containing 6 to 9 carbon atoms (naphtha cut), by reduction of the initial point of the cut.

The process can thus be used to obtain hydrocarbons in the range of cuts including liquefied petroleum gas (LPG), naphtha, diesel and kerosene, more particularly hydrocarbons in the naphtha, diesel and kerosene range with distillation ranges with an initial point in accordance with standard D-86 respectively in the range 20° C. to 40° C., 170° C. to 190° C. and 220° C. to 260° C.

The hydrocarbon cuts may be derived from XTL techniques, including BTL, CTL and GTL techniques, or may be derived from the hydrotreatment of vegetable or animal oils. These feeds or distillates are primarily constituted by paraffins and iso-paraffins and thus have low densities which do not satisfy the market specifications regarding finished products.

The selected cut or cuts forming the feed are sent to at least one first reforming step in at least one reforming unit in the presence of a reforming catalyst so that the essentially paraffinic hydrocarbons present in the feed are transformed into aromatics, which are high density compounds; thus, the commercial specifications for the desired finished product, kerosene and/or gas oil, can be satisfied. This reforming step also allows production of a hydrogen stream.

In a variation of the invention, the first feed formed by cuts containing 9 to 15 carbon atoms, preferably 9 to 13 carbon atoms, is sent to a first distillate reforming unit CCR and a second feed formed by cuts containing 16 to 22 carbon atoms is sent to a second distillate reforming unit CCR. These two feeds ($C_9$-$C_{15}$ and $C_{16}$-$C_{22}$) may be derived from the step for fractionation of the $C_9$-$C_{22}$ feed. The two reforming units are independent.

The reaction section CCR used in the catalytic reforming process of the present invention comprises 1 to 5 reactors in series, preferably 2 to 4 reactors in series, operating in moving bed mode.

Two cases are possible for the reaction zone technology:
the reactors are disposed side by side, with the catalyst being transported from the bottom of one reactor to the head of the next; on arrival to the bottom of the last reactor, it is supplied to the regeneration column via a riser;
the reactors are disposed in a vertical stack and the catalyst then flows under gravity from one reactor to the next one located below it. A riser at the bottom of the last reactor can be used to introduce the catalyst to the head of the regeneration column.

The present invention is entirely compatible with these two techniques, one known as "side by side", the other known as "stacked".

The operating conditions are as follows:
Temperature in the range 350° C. to 540° C., preferably in the range 400° C. to 500° C.;
Pressure in the range 0.2 MPa to 2 MPa, preferably in the range 0.35 MPa to 1.5 MPa;
Recycle ratio: higher than for conventional naphtha reforming, in the range 1.5 to 7, preferably in the range 2 to 6, and more preferably in the range 3 to 5 in order to limit coking of the catalyst.

The operating conditions are adapted as a function of the selected cuts, $C_5$-$C_9$, $C_9$-$C_{15}$ or $C_{16}$-$C_{22}$, for example.

The catalyst used in the reforming unit is a conventional reforming catalyst which is well known to the skilled person.

In a variation of the invention, the catalyst generally comprises a support comprising at least one refractory oxide and/or one or more zeolites. It comprises at least one noble metal, preferably platinum. It optionally comprises one or more additional elements selected from the group constituted by elements from group IA, IIA, the lanthanides, elements from group IVA, preferably silicon and/or tin, elements from group IIIB, elements from group IIIA, preferably indium, elements from group VA, preferably phosphorus and elements from group VIIB, preferably rhenium.

In a variation of the invention, the catalyst used in a conventional reforming unit and in the distillate reforming unit is a reforming catalyst with the following characteristics:
platinum/tin or platinum/iridium catalysts with platinum contents of 0.05% to 1%, preferably 0.15% to 0.4%, with a multi-promoter formulation (germanium, indium, phosphorus, gallium, bismuth);

a specific surface area, in order to overcome diffusional constraints: 50 m$^2$/g to 300 m$^2$/g, preferably 80 m$^2$/g to 200 m$^2$/g;

pore size and metals distribution: thin layer of support with a specific surface area of 80 to 250 m$^2$/g on a support with a very low specific surface area;

in the form of beads.

The distribution of the catalyst in the distillate reforming unit may be graduated or flat.

The graduated catalyst distribution is described in U.S. Pat. No. 5,858,205. It consists of a catalyst distribution which increases for each of the reactors of the reforming unit. As an example, for 3 reactors, the first reactor comprises 20% of the catalyst weight, the second reactor comprises 30% of the catalyst weight and the third reactor comprises 50% of the catalyst weight. In the case of 4 reactors, the first comprises 10% of catalyst, the second comprises 15%, the third comprises 25% and the fourth comprises 50%, for example.

The flat catalyst distribution is described in patent FR 2 926 819, and consists of an identical distribution in each of the reactors of the reforming unit. For 3 reactors, for example, the distribution is such that each of the 3 reactors comprises 30% to 36% by weight of catalyst. In the case of 4 reactors, the distribution is such that each of the 4 reactors comprises in the range 22% to 28% by weight of catalyst.

In accordance with a variation of the process of the invention, the catalyst is regenerated in a catalyst regeneration zone which itself comprises a certain number of steps, including a step for combustion of the coke deposited on the catalyst in the reaction zone carried out in a combustion bed, an oxychlorination step carried out in an oxychlorination zone in order to re-disperse the crystallites, a calcining step and a final step for reduction of the catalyst with hydrogen, which can reduce the oxides of the catalyst before re-introducing it into the reaction zone. The regeneration may also comprise a step for washing and drying the regeneration gases.

During the combustion step which takes place in a combustion bed, the catalyst is generally treated at a pressure of 3 to 10 bars and at a temperature in the range 350° C. to 550° C. by a combustion gas comprising 0.01% to 1.3% of oxygen by volume moving as a co-current with the catalyst.

The combustion zone may comprise at least one second bed. The catalyst therein is generally treated at a pressure of 3 to 10 bar. This pressure is generally close to that prevailing in the first combustion bed.

The temperature in the second bed is generally greater than the temperature prevailing in the first bed by at least 20° C.

The combustion in the second bed generally takes place in the presence of a gas which has moved through the first bed and in the presence of a portion of the effluent originating from the outlet from the oxychlorination zone. Further, an inert makeup gas, preferably nitrogen, as well as a makeup stream of air may also be added to the second bed.

The aim is for the catalyst to be in contact with a gas comprising in the range 0.01% to 1.3% by volume of oxygen, the gases moving as a co-current with the catalyst.

The device for carrying out the process of the invention comprises a regeneration zone which may include several sections for burning coke (also termed a combustion bed) in series in order to limit the exothermicity of the reaction (for example two for naphtha, three to five for cuts consisting of kerosene/gas oil middle distillate). The treatment of feeds of the kerosene/gas oil middle distillate type in a CCR type unit may result in substantial deposits of coke on the catalyst compared with that which the skilled person would know from a gasoline-orientated operation. In this latter application, the coke on the catalyst in the regeneration zone is burned in 1 to 3 burning zones, more particularly 1 or 2, as is conventional. For the kerosene/gas oil application, this invention may require 1 to 6 burning zones, preferably 1 to 4.

In the oxychlorination zone, the catalyst is generally treated in a counter-current with a mixture of a gas comprising oxygen which originates:

in part from the calcining zone;

in part from recycling the gaseous effluent from the oxychlorination zone if it exists, via a blower;

in part from a makeup of oxygen, preferably in the form of air;

in part from a fraction of gas derived from the washing section and from the drying section when they exist.

The chlorinating agent or agents is/are generally selected from the group constituted by chlorine, hydrogen chloride and halogenated hydrocarbons containing less than 4 carbon atoms and 1 to 6 chlorine atoms.

As an example, it may be $C_2Cl_4$, $CCl_4$ or any other chlorinating agent known in these regeneration processes to release chlorine. They are preferably introduced as a mixture with the oxygen-containing gas.

When the oxychlorination zone is composed of moving and axial beds, the chlorinating agent is generally introduced into the lower portion of the oxychlorination zone so that it flows as a counter-current to the catalyst.

The water may be supplied in the liquid or vapour form, preferably in the vapour form. The water or water precursor may be supplied to the oxychlorination zone as a mixture with the oxygen-containing gas.

The $H_2O/HCl$ molar ratio in the oxychlorination zone is in the range 1 to 50, preferably in the range 1 to 40, and more preferably in the range 1 to 30.

The oxychlorination step is carried out in the presence of a gas comprising less than 40%, preferably less than 30%, preferably less than 21% by volume of oxygen, highly preferably in the range 4% to 21% by volume of oxygen, still more preferably in the range 10% to 21% by volume of oxygen, and at least 50 ppm by weight of chlorine, at a temperature in the range 350° C. to 600° C., preferably in the range 350° C. to 550° C., more preferably in the range 450° C. to 550° C., more preferably in the range 490° C. to 550° C.

The pressure in this zone is in the range 3 to 10 bar for moving bed processes, in particular for low pressure reforming processes. The residence time for the catalyst in the oxychlorination step is generally less than 3 hours, preferably in the range 30 minutes to 3 hours.

The calcining step is carried out in the calcining zone in which the catalyst is treated for 20 to 160 minutes at a temperature in the range 350° C. to 600° C., at a pressure in the range 3 to 10 bar, with a makeup of dry air, possibly mixed with a portion of the gases deriving from the washing section. The gas supplied to the calcining zone comprises at most 21% by volume of oxygen. It generally moves as a counter-current to the catalyst in the case of moving bed processes with an axial calcining zone.

In a variation, the only makeup of oxygen-containing gas is made at the inlet to the calcining zone.

The calcining step is followed by a step for reduction of the catalyst at a pressure in the range 0.3 to 1 MPa and at a temperature in the range 420° C. to 550° C.

In one implementation of the invention, the gaseous effluent from the combustion bed is generally sent to a washing section as a mixture with a portion of the gaseous effluents from the oxychlorination zone. A portion of the effluent from this washing section is purged and the other portion is generally sent to a drying section then is generally sent to a compressor. A portion of the effluent from the compressor is generally sent to the combustion bed and optionally, a portion is sent to the oxychlorination and calcining zones.

The skilled person is aware that the principal factor in ageing of a CCR catalyst results from the hydrothermal conditions to which the catalyst is subjected during the various regeneration stages. Applying a process section that can reduce the water content of burning effluents upstream or downstream of the burning sections, irrespective of the method applied (condensation by reduction of temperature and/or drying by capture on a dedicated mass) means that this ageing process can be slowed down and the performance of the unit can be ensured over long periods of operation.

After the regeneration zone, the catalyst is re-introduced to the head of the first reactor of the reaction zone.

In another variation of the process of the invention, when at least two catalytic reforming units are used, the units have a common catalyst regeneration zone, also termed a common catalyst regeneration loop. This common zone functions in the same manner as a conventional regeneration zone. It is supplied by at least two streams of spent catalyst and itself supplies at least two reforming units with regenerated catalyst.

In another variation of the process of the invention, each reforming unit has its own regeneration zone the configuration (number of combustion beds) of which may be identical or different.

This type of configuration with a common loop means that at least one catalyst regeneration section can be dispensed with.

At the end of the reforming step, the effluent obtained is sent to a fractionation or distillation section. When there are two reforming units treating two feeds ($C_9$-$C_{15}$ and $C_{16}$-$C_{22}$), the effluents obtained are each sent to a distinct fractionation zone or to a common fractionation zone. During this fractionation step the effluent is fractionated into various cuts:
- a liquid petroleum gas cut (LPG);
- a cut comprising hydrocarbons containing 5 to 8 carbon atoms ($C_5$-$C_8$): naphtha (initial boiling point in the range 20° C. to 40° C. in accordance with standard D-86, preferably 30° C. and with an end point in the range 150° C. to 200° C. in accordance with standard D-86, preferably 180° C.);
- a cut comprising hydrocarbons containing 9 to 15 carbon atoms ($C_9$-$C_{15}$): densified kerosene (initial boiling point in the range 170° C. to 190° C. according to standard D-86, preferably 180° C., and with an end point in the range 220° C. to 270° C. in accordance with standard D-86, preferably 250° C.);
- a cut comprising hydrocarbons containing 16 to 22 carbon atoms ($C_{16}$-$C_{22}$): a densified gas oil cut (initial boiling point in the range 230° C. to 260° C. in accordance with standard D-86, preferably 250° C., and an end point in the range 320° C. to 370° C. in accordance with standard D-86, preferably 350° C.).

This novel process for reforming distillate is distinguished from the conventional naphtha reforming process in that the end point for the feed in accordance with standard D-86 is no longer 180° C.-210° C. but may be up to 300° C.-350° C. for, respectively, a kerosene or gas oil application.

By analogy with the process for reforming naphtha cuts alone, this process can be used to produce substantial quantities of hydrogen, thus improving the hydrogen balance of the refinery or the XTL complex (optional post-treatment might be necessary depending on the origin, principally GTL, CTL or BTL) or products derived from the hydrotreatment of vegetable or animal oils.

The severity of the operation of this type of process may be controlled in order, if necessary, to limit the concentration of aromatics in the reaction effluent. This is thus known as a high or low aromatics conversion process.

In accordance with another implementation of the invention, the process of the invention may be carried out in a CCR type reforming unit with staged injection of the various feeds: naphtha, kerosene then gas oil or naphtha, gas oil then kerosene.

In accordance with another implementation of the invention, the process of the invention may be carried out in a CCR type reforming unit with reaction sections which are independent for each different feed (naphtha, kerosene, gas oil) and a common regeneration section.

Figure 2:
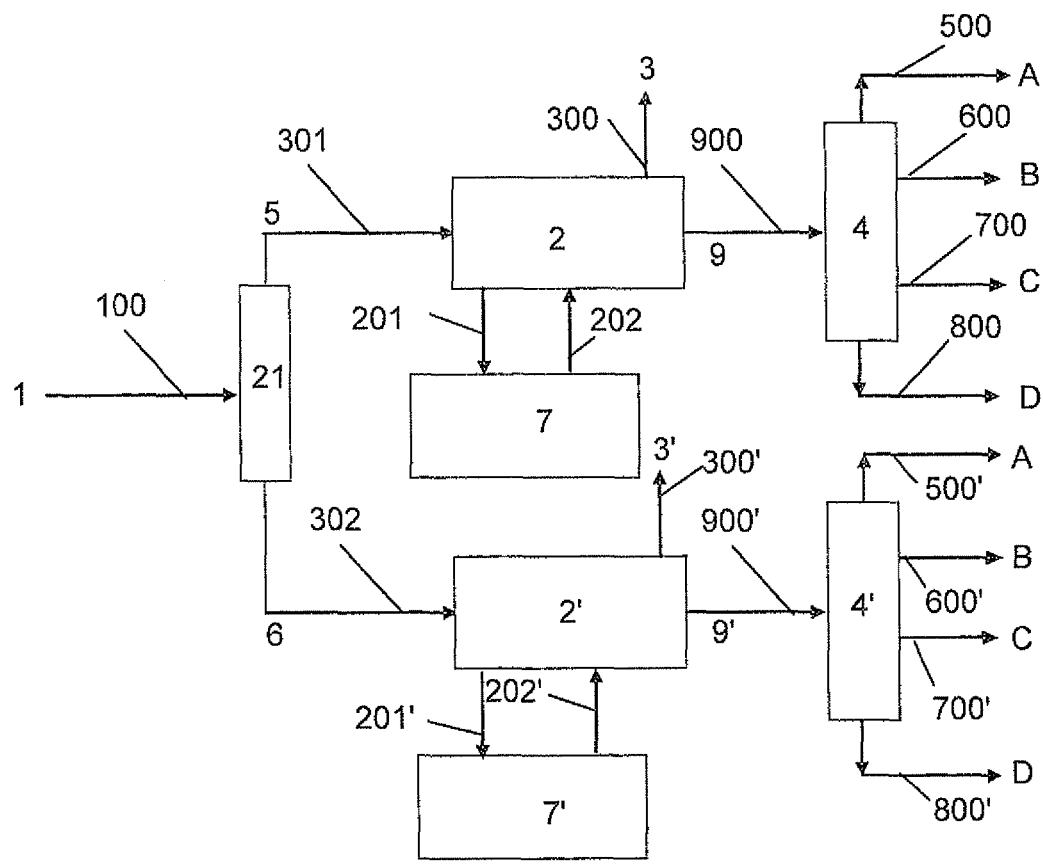
FIG. 2 is a diagrammatic representation of a second variation of the process of the invention.
Figure 3:
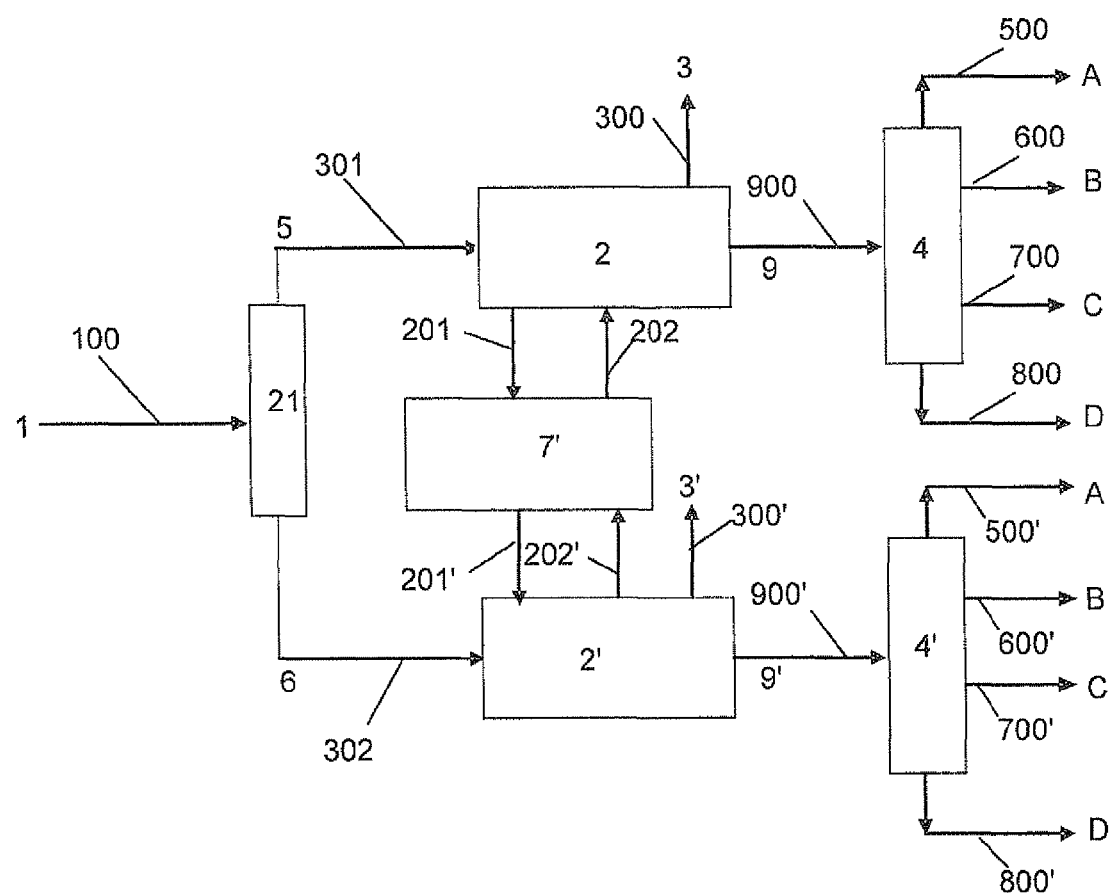
FIG. 3 is a diagrammatic representation of a third variation of the process of the invention.

Preferred Variations of the Invention:

FIGS. 1 to 3 represent three possible variations of the process of the invention.

FIG. 1 illustrates a variation in which a feed 1 composed of one or more hydrocarbon cuts containing 9 to 22 carbon atoms, also termed a middle distillate, is sent to a reforming unit 2 via a line 100 coming into the reforming unit 2. A stream of hydrogen 3 which is produced is evacuated from the reforming unit 2 via the line 300. The effluent 9 from the reforming reaction section 2 is then sent to a distillation zone 4 via a line 900 connecting the reforming unit 2 to the distillation unit 4. The effluent 9 is then distilled into 4 cuts:
- a liquefied petroleum gas cut (LPG) (A), evacuated via the line 500;
- a $C_5$-$C_8$ cut: naphtha (B), evacuated via the line 600;
- a $C_9$-$C_{15}$ densified kerosene cut (C), evacuated via the line 700;
- a $C_{16}$-$C_{22}$ cut: densified gas oil cut (D), evacuated via the line 800.

FIG. 2 illustrates a variation in which a feed 1 composed of one or more hydrocarbon cuts containing 9 to 22 carbon atoms, preferably also termed a middle distillate, is sent to a fractionation unit 21. This unit 21 allows fractionation of the feed into two cuts, a first cut containing 9 to 15 carbon atoms, 5, and a second cut containing 16 to 22 carbon atoms, 6. The first cut containing 9 to 15 carbon atoms, 5, is evacuated via a first line 301 connecting the fractionator 21 to a first reforming unit 2. The second cut containing 16 to 22 carbon atoms, 6, is evacuated via a second line 302 connecting the fractionator 21 to a second reforming unit 2'. Each of the two reforming units 2, 2' comprises a catalyst regeneration zone 7, 7'. The spent catalyst originating from the first reforming unit 2 is sent via the line 201 to the first regeneration zone 7 and the regenerated catalyst is returned to the first reforming unit 2 via the line 202. The same steps are carried out for the second reforming unit 2' where the spent catalyst originating from the second reforming unit 2' is sent via the line 201' to the second regeneration zone 7' and the regenerated catalyst is returned to the second reforming unit 2' via the line 202'. A stream of hydrogen produced, 3, is evacuated from the first reforming unit 2 via the line 300 and a stream of hydrogen produced, 3', is evacuated from the second reforming unit 2' via the line 300'. The effluents 9, 9' from each of the two reforming reaction zones 2, 2' are then sent to a distinct distillation zone for each effluent 4, 4' via the line 900, 900', each connecting a reforming unit 2, 2' to a distillation unit 4, 4'. Each of the effluents 9, 9' is then fractionated into 4 cuts:
- a liquefied petroleum gas cut (LPG) (A), evacuated via the line 500, 500';
- a $C_5$-$C_8$ cut: naphtha (B), evacuated via the line 600, 600';
- a $C_9$-$C_{15}$ densified kerosene cut (C), evacuated via the line 700, 700';
- a $C_{16}$-$C_{22}$ cut: densified gas oil cut (D), evacuated via the line 800, 800'.

In another variation of the invention, not shown, which derives from that illustrated in FIG. 3, the effluents from each of the two reforming reaction zones with a distinct regeneration zone are then sent to a common distillation zone. The mixture of the two effluents is thus fractionated into 4 cuts:

- a liquefied petroleum gas cut (LPG);
- a $C_5$-$C_8$ cut: naphtha;
- a $C_9$-$C_{15}$ densified kerosene;
- a $C_{16}$-$C_{22}$ cut: densified gas oil.

FIG. 3 illustrates a variation in which a feed 1 composed of one or more hydrocarbon cuts containing 9 to 22 carbon atoms, also termed a middle distillate, is sent to a fractionation unit 21. This unit 21 can be used to fractionate the feed into two cuts, a first cut containing 9 to 15 carbon atoms, 5, and a second cut containing 16 to 22 carbon atoms, 6. The first cut containing 9 to 15 carbon atoms, 5, is evacuated via a first line 301 connecting the fractionator 21 to a first reforming unit 2. The second cut containing 16 to 22 carbon atoms, 6, is evacuated via a second line 302 connecting the fractionator 21 to a second reforming unit 2'. These two reforming units 2, 2' comprise a common catalyst regeneration zone 7. The spent catalyst originating from the two reforming units 2,2' is sent to the regeneration zone 7' via the lines 201, 201' and the regenerated catalyst is returned to each of the two reforming units 2, 2' via the lines 202, 202'. A stream of hydrogen produced, 3, is evacuated via the line 300 originating from the first reforming unit 2 and a stream of hydrogen produced, 3', is evacuated via the line 300' originating from the second reforming unit 2'. The effluents 9, 9' from each of the two reforming reaction zones 2, 2' are then sent to a distinct distillation zone for each effluent 4, 4' via the line 900, 900' each connecting a reforming unit 2, 2' to a distillation unit 4, 4'. Each of the effluents 9, 9' is then fractionated into 4 cuts:

- a liquefied petroleum gas cut (LPG) (A), evacuated via the line 500, 500';
- a $C_5$-$C_8$ cut: naphtha (B), evacuated via the line 600, 600';
- a $C_9$-$C_{15}$ densified kerosene cut (C), evacuated via the line 700, 700';
- a $C_{16}$-$C_{22}$ cut: densified gas oil cut (D), evacuated via the line 800, 800'.

In another variation of the invention, not shown, which derives from that illustrated in FIG. 3, the effluents from each of the two reforming reaction zones with a common regeneration zone are then sent to a common distillation zone. The mixture of the two effluents is then fractionated into 4 cuts:

- a liquefied petroleum gas cut (LPG);
- a $C_5$-$C_8$ cut: naphtha;
- a $C_9$-$C_{15}$ densified kerosene;
- a $C_{16}$-$C_{22}$ cut: densified gas oil.

The following example illustrates an implementation of the invention

EXAMPLE IN ACCORDANCE WITH THE INVENTION

Catalytic reforming tests in accordance with the process of the invention were carried out on a kerosene feed ($C_9$-$C_{15}$) from a Fischer-Tropsch (FT) process. Table 1 summarizes the principal properties obtained for the various tests carried out (high aromatics conversion operation and low aromatics conversion operation).

TABLE 1

| | Kerosene before reforming, from FT | Low conversion reformed kerosene | High conversion reformed kerosene | Specification |
|---|---|---|---|---|
| Density | 0.760 | 0.778 | 0.815 | 0.775–0.840 |
| Smoke point (mm) | More than 50 mm | 36 | 26 | 25.0 min |
| Freezing point (° C.) | −40 | −48 | −52 | −47° C. max |
| Naphthalenes (vol %) | 0 | 0.33 | 2.03 | 3 max |

These results show that the reforming process of the invention can be used to obtain reformed cuts which satisfy specifications.

The present invention should not be limited to the details given above; many other specific implementational forms are possible without departing from the field of application of the invention. As a result, the present implementations should be considered to be by way of illustration, and may be modified without, however, departing from the scope of the invention as defined in the accompanying claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 10/04.245, filed Oct. 28, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for reforming a feed composed of one or more hydrocarbon cuts containing 9 to 22 carbon atoms, comprising:
   at least one of the hydrocarbons cuts containing 9 to 22 carbon atoms are sent as a feed to a reforming unit;
   reforming said feed in the presence of a reforming catalyst in at least one reforming unit to transform the hydrocarbons cuts containing 9 to 22 carbon atoms into aromatics, and during which a stream of hydrogen and an effluent are produced;
   distilling said effluent from the reforming unit at least once, in order to obtain 4 cuts wherein said cuts are:
   a liquefied petroleum gas cut (LPG) (A);
   a $C_5$-$C_8$ cut: naphtha (B);
   a $C_9$-$C_{15}$ cut: densified kerosene (C);
   a $C_{16}$-$C_{22}$ cut: densified gas oil cut (D).

2. A process according to claim 1, wherein the feed is reformed at a temperature in the range 350° C. to 540° C., and a pressure in the range 0.2 to 2 MPa.

3. A process according to claim 1, wherein reforming the feed is carried out with a recycle ratio in the range 1.5 to 7.

4. A process according to claim 1, additionally comprising: fractioning of the feed into two hydrocarbon cuts before the reforming step, wherein a first cut contains 9 to 15 carbon atoms and a second cut contains 16 to 22 carbon atoms.

5. A process according to claim 4, wherein the first cut and the second cut are reformed separately.

6. A process according to claim 1, additionally comprising regenerating the reforming catalyst.

7. A process according to claim 5, additionally comprising: regenerating the reforming catalyst after reforming said first and said second cuts.

8. A process according to claim 5, additionally comprising:
Independently regenerating the reforming catalyst after each of said first and said second cuts are reformed.

9. A process according to claim 5, additionally comprising: distilling the effluents from the two hydrocarbon cuts separately.

10. A process according to claim 1, in which said feed is derived from XTL technology or from the hydrotreatment of vegetable or animal oils.

11. A process according to claim 1, wherein no hydrocarbon cracking process occurs.

* * * * *